(12) United States Patent
Sato et al.

(10) Patent No.: US 9,574,029 B2
(45) Date of Patent: Feb. 21, 2017

(54) SUBSTRATE FOR FLEXIBLE DISPLAY DEVICE AND FLEXIBLE DISPLAY DEVICE

(71) Applicants: LG DISPLAY CO., LTD., Seoul (KR); TOKYO INSTITUTE OF TECHNOLOGY, a Japanese National University Corp., Tokyo (JP)

(72) Inventors: Osamu Sato, Tokyo (JP); Masatoshi Tokita, Tokyo (JP); Junji Watanabe, Tokyo (JP)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/878,191

(22) Filed: Oct. 8, 2015

(65) Prior Publication Data
US 2016/0108152 A1    Apr. 21, 2016

(30) Foreign Application Priority Data

Oct. 17, 2014   (JP) .................................. 2014-212174

(51) Int. Cl.
*C08F 2/00*   (2006.01)
*C08G 73/10*   (2006.01)
*C08F 120/14*   (2006.01)
*C08F 292/00*   (2006.01)

(52) U.S. Cl.
CPC ........... *C08F 120/14* (2013.01); *C08F 292/00* (2013.01)

(58) Field of Classification Search
CPC .............................. C08F 120/14; C08G 77/00
USPC .......................................... 526/194; 524/847
See application file for complete search history.

(56) References Cited

FOREIGN PATENT DOCUMENTS

WO   WO 2011/162971 A2  *  12/2011

* cited by examiner

*Primary Examiner* — William Cheung
(74) *Attorney, Agent, or Firm* — Dentons US LLP

(57) ABSTRACT

A substrate for a flexible display device according to an embodiment of the present invention may include a self-supporting film where a particle has a grafted polymer chain and is disposed in two dimensions or three dimensions through the grafted polymer chain.

9 Claims, 1 Drawing Sheet

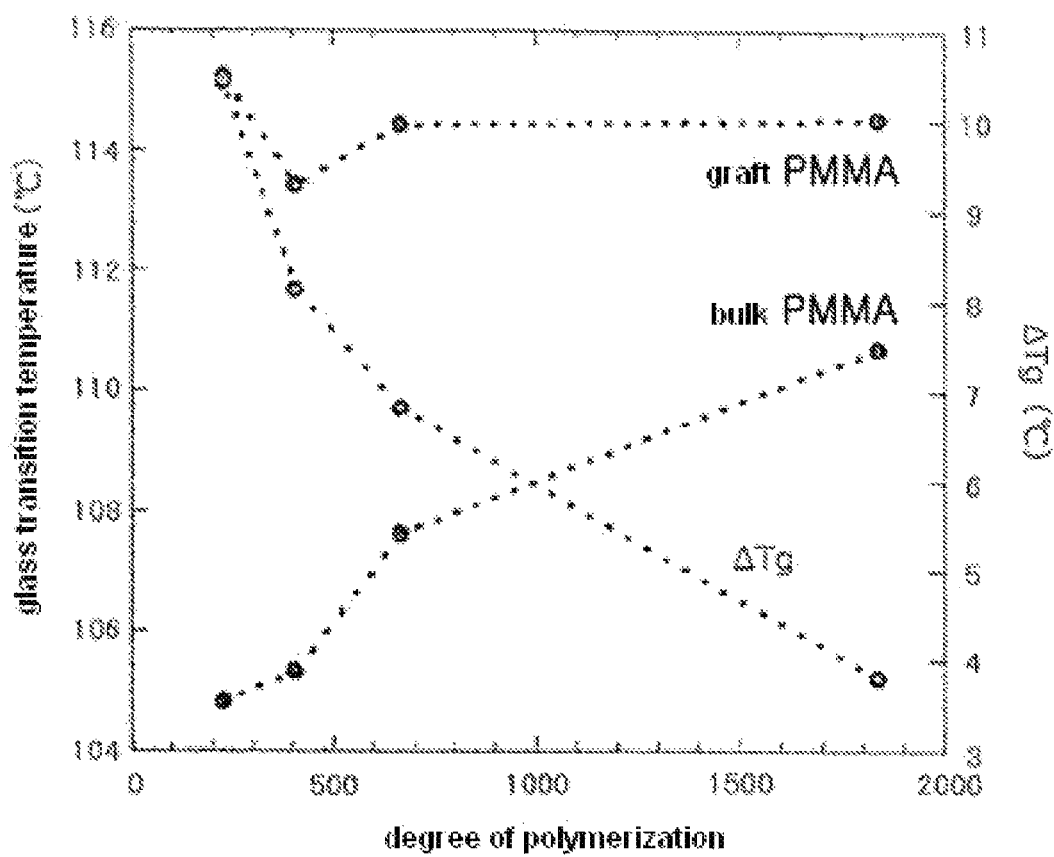

SUBSTRATE FOR FLEXIBLE DISPLAY DEVICE AND FLEXIBLE DISPLAY DEVICE

This application claims the benefit of Japanese Patent Application No. 2014-212174, filed on Oct. 17, 2014, which is hereby incorporated by reference for all purposes as if fully set forth herein.

BACKGROUND OF THE INVENTION

Field of the Invention

The present invention relates to a substrate for a flexible display device. More particularly, the present invention relates to a substrate having excellent heat tolerance and surface hardness, and low price, and a flexible display device including the substrate.

Discussion of the Related Art

Among various display devices such as a liquid crystal display (LCD) device and a organic light emitting diode (OLED) display device, a flexible display device having advantages in a thin profile, a light weight, a large dimensional size, a degree of freedom of shape and a curved display has attracted attention, and a substrate replacing a glass substrate that is heavy and fragile has been developed. Various properties such as heat tolerance, flexibility and transparency are required for a substrate used in a flexible display device (which is referred to as 'a substrate for a flexible display device' hereinafter).

Recently, as a device formation technology using a transcription (e.g., Patent Document 1: Japanese Publication No. 2012-156523) is commercialized, mass production of a flexible display device has been realized. A process where a series of fabrication steps are performed for a resin for transcription (e.g., polyimide etc.) on a glass substrate and then the resin for transcription is detached from the glass substrate by a method such as a laser ablation, etc. is required for the device formation technology using a transcription. In addition, since the resin for transcription is required to tolerate a process temperature (500° C.) of forming a thin film transistor (TFT), the resin for transcription has a relatively high price. According to the above factors, a flexible display device has a cost higher than the conventional display device using a glass substrate.

To solve the above problems, a TFT formation technology through a printing method has been suggested. Although the process temperature of forming a TFT is drastically reduced by the TFT formation technology through a printing method as compared with a conventional method, a process temperature of at least 150° C. is required to obtain a property of a TFT and a resistance of a line for real utilization.

Since transparent polyimide and aromatic polyether resin have excellent properties such as heat tolerance and transparency, it has been suggested to use a film of transparent polyimide and aromatic polyether resin as a substrate for a flexible display device (e.g., Patent Document 2: Japanese Publication No. 2010-152004). However, since transparent polyimide and aromatic polyether resin have a high price, there is a problem that a fabrication cost of a flexible display device increases.

Although a conventional resin film such as polyethylene terephthalate (PET), etc. has transparency and low price, the conventional resin film has poor heat tolerance even for a TFT formation technology through a printing method. In addition, the conventional resin has problems that the flexible display device may be easily damaged due to low surface hardness and display quality of the flexible display device may be reduced due to high retardation.

Accordingly, a method of dispersing an inorganic particle in a resin film has been considered as a method of improving heat tolerance and surface hardness.

However, it is difficult to uniformly disperse an inorganic particle in a resin film. For example, a resin film including an inorganic particle may be fabricated by forming a resin material including an inorganic particle into a film shape. Since the inorganic particle may agglomerate and/or precipitate in the resin material, it is difficult to obtain a resin film where an inorganic particle is uniformly dispersed. As a result, a portion of the resin film where the organic particle is not dispersed may have insufficient heat tolerance and surface hardness.

SUMMARY OF THE INVENTION

Accordingly, the present invention is directed to a substrate for a flexible display device and a flexible display device that substantially obviate one or more of the problems due to limitations and disadvantages of the related art.

An advantage of the present invention is to provide a substrate for a flexible display device which has sufficient heat tolerance for a TFT formation process through a printing method, excellent surface hardness, flexibility and transparency, low retardation and low price.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a substrate for a flexible display device includes a self-supporting film where a particle having a grafted polymer chain is disposed in two dimensions or three dimensions through the grafted polymer chain.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a graph showing a relation between a degree of polymerization and a glass transition temperature of a self-supporting film according to a second embodiment of the present invention.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts.

A substrate for a flexible display device according to an embodiment of the present invention may include a self-supporting film where a particle has a grafted polymer chain and is disposed in two dimensions or three dimensions through the grafted polymer chain.

In the description, the 'grafted polymer chain' means a polymer chain that extends from a surface of the particle by a polymerization and has a chain length greater than two, and may be referred to as a polymer brush.

In the description, the 'particle' means a particle that has an average diameter equal to or smaller than 1 μm, and the 'average diameter' means a 50% cumulative average that is measured by a laser diffraction type particle size measuring apparatus. As a size of the particle decreases, transparency of the self-supporting film increases. Accordingly, the average diameter of the particle may be 1 nm to 500 nm, beneficially 3 nm to 100 nm, more beneficially 5 nm to 50 nm, and most beneficially 8 nm to 30 nm.

The particle according to an embodiment of the present invention is not particularly limited and a particle publicly known in the art may be used for the self-supporting film. For example, a particle of silicon compound such as silica, etc.; noble metal such as Au, Ag, Pt, Pd, etc.; transition metal such as Ti, Zr, Ta, Sn, Zn, Cu, V, Sb, In, Hf, Y, Ce, Sc, La, Eu, Ni, Co, Fe, etc.; inorganic material such as oxide or nitride thereof; and various organic material may be used for the self-supporting film. Among various particles, silica has advantages in heat tolerance and transparency.

The particle having the grafted polymer chain may be formed through a surface graft polymerization method using a living radical polymerization. The grafted polymer chain of which a chain length and a chain length distribution are regulated may be formed on a surface of the particle with a relatively high density through a surface graft polymerization. The grafted polymer chain may have a state where the grafted polymer chain extends perpendicularly from the surface of the particle (a concentrated polymer brush state) adjacent to the surface of the particle due to steric hindrance between adjacent grafted polymer chains. Since the steric hindrance between adjacent grafted polymer chains is mitigated when the grafted polymer chain is spaced apart from the surface of the particle, the grafted polymer chain may have a state where a degree of extension is lower than that of the concentrated polymer brush state (a semi-dilute polymer brush state). A grafting density of the grafted polymer chain in the concentrated polymer brush state may be equal to or greater than 0.1 chains/nm$^2$, beneficially 0.1 chains/nm$^2$ to 1.2 chains/nm$^2$, and a grafting density of the grafted polymer chain in the semi-dilute polymer brush state may be smaller than 0.1 chains/nm$^2$, beneficially 0.01 chains/nm$^2$ to 0.1 chains/nm$^2$.

It is beneficial that the grafted polymer chain formed on the particle has only the concentrated polymer brush state, i.e., the grafting density of the grafted polymer chain is equal to or greater than 0.1 chains/nm$^2$. The heat tolerance of the self-supporting film may be improved by using the particle having the grafted polymer chain in only the concentrated polymer brush state. The grafted polymer chain in only the concentrated polymer brush state may be obtained by adjusting a degree of polymerization.

In the description, the 'living radical polymerization' means a radical polymerization where a chain transfer reaction and a termination reaction do not occur and a chain growth end maintains an active property even after a monomer for radical polymerization finishes a reaction. Since an end of a generated polymer maintains an active property of polymerization even after the end of polymerization, the polymerization may be initiated again when a monomer for radical polymerization is added. In the living radical polymerization, a polymer having a predetermined average molecular weight may be synthesized by adjusting a concentration ratio of a polymer for radical polymerization and an initiator, and a generated polymer may have a narrow molecular weight distribution.

A representative example of the living radical polymerization according to the present invention is an atom transfer radical polymerization (ATRP). For example, after an initiator is fixed to the surface of the particle, the ATRP of a monomer for radical polymerization may be performed using copper halide/ligand complex to obtain the particle having the grafted polymer chain.

A method of fixing an initiator on a surface of a particle is not particularly limited and, for example, a particle and an initiator may contact each other.

The initiator according to the present invention is not particularly limited if it is possible that the initiator is fixed onto a surface of a particle, and an initiator publicly known in the art may be used. Beneficially, a compound having halogen at an end thereof may be used as an initiator. For example, a compound illustrated by a following chemical formula (1) or (2) may be used as an initiator.

[CHEMICAL FORMULA 1]

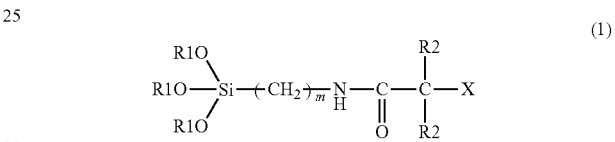

[CHEMICAL FORMULA 2]

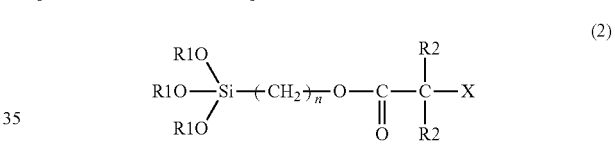

In the chemical formulae (1) and (2), R1 is independently an alkyl group of C1 to C3, respectively, beneficially a methyl group or an ethyl group; R2 is independently a methyl group or an ethyl group, respectively; X is a halogen atom, beneficially Br; m is an integer of 2 to 10, beneficially an integer of 3 to 8; n is an integer of 3 to 10, beneficially an integer of 4 to 8.

For example, a compound of the chemical formula (1) may include 2-Bromo-2-methyl-N-[3-(triethoxysilyl)propyl]propanamide (BPA), etc. and a compound of the chemical formula (2) may include (2-Bromo-2-methyl)propionyloxyhexyltriethoxysilane (BHE), etc.

The radical polymerization monomers (radically polymerizable monomers) used in the living radical polymerization have unsaturated bond which can perform radical polymerization in the presence of organic radical. The radical polymerization monomers comprise, but are not limited to, acrylic acid derivatives, methacrylic acid derivatives, styrene derivatives, vinyl acetates, acrilonitriles, and the likes, and combination thereof. More specifically, the radical polymerization monomers comprises, but are not limited to, methacrylate monomers such as methyl methacrylate, ethyl methacrylate, propyl methacrylate, n-butyl methacrylate, t-butyl methacrylate, hexyl methacrylate, 2-ethyl hexyl methacrylate, nonyl methacrylate, benzyl methacrylate, cyclo-hexyl methacrylate, lauryl methacrylate, n-octyl methacrylate, 2-methoxyethyl methacrylate, butoxyethyl methacrylate, methoxy tetraethylene glycol methacrylate, 2-hydroxyethyl methacrylate, 2-hydroxypropyl methacrylate, 3-chloro-2-hydroxypropyl methacrylate, tetrahydrofurfuryl methacrylate, 2-hydroxy-3-phenoxypropyl methacrylate, diethylene glycol methacrylate, polyethylene glycol methacrylate, 2-(dimethylamino)ethyl methacrylate and the likes; acrylate monomers such as methyl acrylate, ethyl acrylate, propyl acrylate, n-butyl acrylate, t-butyl acrylate, hexyl acrylate, 2-ethyl hexyl acrylate, nonyl acrylate, benzyl acrylate, cyclo-hexyl acrylate, lauryl acrylate, n-octyl acrylate, 2-methoxyethyl acrylate, butoxyethyl acrylate, methoxy tetraethylene glycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethylene glycol acrylate, polyethylene glycol acrylate, 2-(diethylamino)ethyl acrylate, N,N-dimethyl acrylate, N-methylol acrylamide, N-methylol methacrylamide, and the likes; styrene, o-, m-, p-methoxy styrene, o-, m-, p-t-butoxy styrene, o-, m-, p-chloromethyl styrene, vinyl propionate, methyl vinyl ketone, hexyl vinyl ketone, methyl isopropenyl ketone, N-vinylpyrrolidone, N-vinylpyrrole, N-vinylcarbazole, N-vinylindole, acrylonitrile, methacrylonitrile, acrylamide, isopropyl acrylamide, methacrylamide, vinyl chloride, vinylidene chloride, tetrachloro ethylene, hexachloroprene, vinyl fluoride, and the likes, and combination thereof.

A copper halide providing the copper halide/ligand complex is not particularly limited and a copper halide publicly known in the living radical polymerization may be used. For example, the copper halide may include CuBr, CuCl, CuI, etc.

A ligand compound providing the copper halide/ligand complex is not particularly limited and a ligand compound publicly known in the living radical polymerization may be used. For example, the ligand compound comprises, but are not limited to, triphenyl phosphane, 4,4'-dinonyl-2,2'-dipyridine (dNbipy), N,N,N',N',N"-pentamethyl diethylene triamine, 1,1,4,7,10,10-hexamethyltriethylenetetramine, etc.

In fabrication of the particle having the grafted polymer chain, an amount of the particle, the initiator, the monomer for radical polymerization, the copper halide and the ligand compound may be properly adjusted according to a kind thereof and is not particularly limited. In addition, a fabrication condition may be properly adjusted according to a kind of a base material and is not particularly limited.

The living radical polymerization may be performed without a solvent, or a solvent publicly known in the living radical polymerization may be used. For example, the solvent comprises, but are not limited to, organic solvents such as benzene, toluene, anisole, N,N-dimethyl formamide (DMF), dimethyl sulfoxide (DMSO), acetone, chloroform, carbon tetrachloride, tetrahydrofuran (THF), ethyl acetate, trifluoromethyl benzene, methanol, ethanol, isopropanol, n-butanol, ethyl cellosolve, butyl cellosolve, and 1-methoxy-2-propnaol, etc. and water. An amount of the solvent may be properly adjusted according to a kind of a base material and is not particularly limited.

The molecular weight of the grafted polymer chain generated by the living radical polymerization is adjustable according to a reaction temperature, a reaction time and a kind and an amount of a base material. For example, the grafted polymer chain having a number average molecular weight of 500 to 1000000, beneficially 1000 to 500000 may be obtained. In addition, the molecular weight distribution ($M_w/M_n$) of the grafted polymer chain may be controlled within a range of 1.05 to 1.60.

The self-supporting film used as a substrate for a flexible display device according to the present invention may have a structure where the particle having the grafted polymer chain is disposed in two dimensions or three dimensions through the grafted polymer chain.

In the description, the 'self-supporting film' means a film where it is possible to independently maintain a shape without a support.

The self-supporting film may be fabricated by a method publicly known in the art. For example, the self-supporting film may be fabricated by a solvent casting method. In the solvent casting method, after the particle having the grafted polymer chain is dispersed in the solvent and the dispersion solution is coated on a carrier substrate, the solvent is evaporated to form the self-supporting film on the carrier substrate. The self-supporting film may be detached from the carrier substrate.

The carrier substrate is not particularly limited, and a carrier substrate publicly known in the art may be used. For example, a glass plate, a stainless plate, a stainless belt, a polyethylene terephthalate (PET), etc. may be used as the carrier substrate. To improve detachability of the self-supporting film from the carrier substrate, a mirror surface machining or a surface release agent treatment, etc. may be performed to the carrier substrate.

The solvent for dispersing the particle having the grafted polymer chain is not particularly limited, and a solvent publicly known in the art may be used. For example, the solvent for dispersing the particle comprises, but are not limited to, aprotic polar solvent such as N,N-dimethyl formamide (DMF), N,N-dimethyl acetamide (DMA), N-methyl-2-pyrrolidone (NMP), dimethyl sulfoxide (DMSO), and the likes; chloride solvents such as dichloro methane, chloroform, 1,2-dichloroethane, chlorobenzene, dichlorobenzene, and the likes; alcohols such as methanol, ethanol, propanol, and the likes; alkylene glycol alkyl ethers such as ethylene glycol monomethyl ether, ethylene glycol monoethyl ether, propylene glycol monomethyl ether, propylene glycol monoethyl ether, and the likes; toluene; water, etc. and combination thereof.

The concentration of the particle having the grafted polymer chain is not particularly limited and, for example, the particle having the grafted polymer chain may have the concentration of 1 wt % to 30 wt %, beneficially 3 wt % to 20 wt %, more beneficially 5 wt % to 15 wt %.

The amount of the dispersion solution on the carrier substrate is not particularly limited if it is possible that the self-supporting film having a thickness applicable to a substrate for a flexible display device by the amount of the dispersion solution. In addition, to obtain the self-supporting film having a desired thickness, the coating and evaporation steps of the dispersion solution may be performed plural times. The thickness of the self-supporting film applicable to a substrate for a flexible display device may be 0.1 µm to 500 µm, beneficially 0.5 µm to 300 µm, more beneficially 1.0 µm to 250 µm. When the thickness of the self-supporting film is smaller than 0.1 µm, a mechanical strength applicable to a substrate for a flexible display device may not be obtained. When the thickness of the self-supporting film is greater than 500 µm, flexibility and transparency of the self-supporting film may be deteriorated.

The condition of the evaporation step for the dispersion solution is not particularly limited and may be adjusted according to a kind of the solvent for the dispersion solution. For example, the dispersion solution may be heated with a temperature higher than a boiling point of the solvent.

Since the self-supporting film includes the particle having the grafted polymer chain, the particle does not agglomerate and/or precipitate in the self-supporting film. As a result, the particle is uniformly dispersed in the self-supporting film, and surface hardness and heat tolerance are uniformly improved throughout the entire self-supporting film. In addition, since the self-supporting film is based on the grafted polymer chain, the self-supporting film has excellent flexibility and transparency.

In the self-supporting film, a chemical bonding may be formed between the grafted polymer chains of the adjacent particles. For example, a monomer having a functional group, which is crosslinked or polymerized by an external stimulation such as a light or a heat, etc., at a side chain thereof may be used as the monomer for radical polymerization, and a chemical bonding may be formed between the grafted polymer chains of the adjacent particles by adding the external stimulation of a light or a heat, etc. to the self-supporting film. As a result, a mechanical property of the self-supporting film may be improved.

Hereinafter, the present invention is described in detail by an exemplary embodiment but is not limited on these.

Embodiment 1

A solution is prepared by adding an ethanol of 56.8 g to a methyl isobutyl ketone dispersion solution (product of JGC Catalysts and Chemicals Ltd., content ratio of silica particle: 40.7 wt %) of 1.6 g including a silica particle having an average diameter of 13 nm, and the solution is stirred at a room temperature for 3 minutes using an ultrasonic homogenizer (product of Emerson Japan, Ltd., Advanced Digital Sonifier 450DA). Next, a 28% ammonia solution of 4.9 g is added to the solution, and the solution is stirred at 40° C. for 2 hours. Next, an initiator (BPA) dissolved in an ethanol of 2.7 g is added to the solution, and the solution is stirred at 40° C. for 18 hours. Next, after most of the solvent of the solution is removed by using an evaporator, a small amount of water is added to the solution and a centrifugation of 4500 rpm is performed to the solution to obtain a silica particle having a BPA on a surface thereof (which is referred to as a 'BPA-silica particle' hereinafter).

Next, a mixed solution is formed by adding an MMA 9.4 g (93 mmol), a DMF of 0.4 mL and an anisole of 1.3 mL to the BPA-silica particle of 364.3 mg, and the mixed solution is stirred in an ice bath for 3 minutes using a homogenizer. Next, after the mixed solution, 1,1,4,7,10,10-hexamethyltriethylenetetramine of 53.6 mg (0.2325 mol) and $CuBr_2$ of 20.4 mg (0.15 mol) are inserted in a 2-neck flask and are degassed through a freezing and thawing method, a nitrogen substitution is performed to the mixed solution by adding CuBr of 29.0 mg (0.296 mol) and a polymerization is performed at 40° C. for 12 hours to the mixed solution. After the end of reaction, Cu is deactivated by bubbling the mixed solution. Next, after a silica particle having a PMMA chain on a surface thereof (which is referred to as a 'PMMA-silica particle' hereinafter) is refined by performing reprecipitation to the mixed solution three times in a mixed solution (volume ratio: 4/1) of methanol/EDTA solution of 0.1M, the PMMA-silica particle is dried at 80° C. in a vacuum.

The PMMA-silica particle is immersed in a hydrofluoric acid to dissolve a silica portion and a molecular weight of the separated PMMA (grafted polymer chain) is evaluated using GPC measuring apparatus (product of JASCO Corporation, LC-2000plus). Polystyrene is used as a standard sample and a UV detector is used as a detector. As a result of evaluation, a number average molecular weight is 60100 and a weight average molecular weight is 77500.

Next, a dispersion solution is prepared by mixing the PMMA-silica particle of 1 mg to toluene of 1 mL, and the dispersion solution is coated on the carrier substrate. The self-supporting film having a thickness of 100 μm is obtained by heating the coated dispersion solution at 120° C.

A small angle X-ray scattering (SAXS) measurement and a transmission electron microscope (TEM) inspection are performed to the self-supporting film. As a result of measurement and inspection, it is verified that the silica particle does not agglomerate and/or precipitate and is uniformly dispersed in the self-supporting film.

In addition, a specula transmittance to a visible light of the self-supporting film is measured using an LCD-5200 of Otsuka Electronics Co., Ltd. As a result of measurement, the specula transmittance is about 45% and it is verified that transparency is excellent.

It is possible to wind the self-supporting film around a rod having a diameter of 5 mm, and it is verified that the self-supporting film has sufficient flexibility.

Further, the self-supporting film is set on a stage between two polarizing plates having a crossed nicols state, and the self-supporting film is inspected with the stage rotated. As a result of inspection, coloring of the self-supporting film does not occur, and it is verified that the self-supporting film has relatively low retardation.

Since the silica particle is uniformly dispersed in the self-supporting film with a relatively high concentration, surface hardness of the self-supporting film is higher than that of a film where a particle is not dispersed or a particle is not uniformly dispersed, and it is expected that surface hardness has a constant value in the self-supporting film.

Embodiment 2

PMMA-silica particles of various degrees of polymerization (230 to 1840) are formed by changing a condition of polymerization of the embodiment 1. A self-supporting film is formed using the PMMA-silica particles identically to the embodiment 1.

A glass transition temperature of the self-supporting film is obtained from measurement using differential scanning calorimeter (DSC).

As a comparison, a glass transition temperature of a self-supporting film formed from non-grafted PMMA is evaluated. The results are shown in FIG. 1. In FIG. 1, the self-supporting film formed from the PMMA-silica particle is represented by 'grafted PMMA,' and the self-supporting film formed from the non-grafted PMMA is represented by 'bulk PMMA.'

As shown in FIG. 1, it is verified that the self-supporting film formed from the PMMA-silica particle has higher glass transition temperature and better heat tolerance than the self-supporting film formed from the non-grafted PMMA, regardless of the degree of polymerization.

Consequently, in an embodiment of the present invention, a substrate for a flexible display device which has sufficient heat tolerance for a TFT formation process through a printing method, excellent surface hardness, flexibility and transparency, low retardation and low price is provided.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A substrate for a flexible display device, comprising a self-supporting film where a particle having a grafted poly- mer chain, via living polymerization, is disposed in two dimensions or three dimensions through the grafted polymer chain.

2. The substrate according to claim 1, wherein an average diameter of the particle is equal to or smaller than 100 nm.

3. The substrate according to claim 1, wherein the particle is a silica particle.

4. The substrate according to claim 1, wherein a grafting density of the grafted polymer chain is equal to or greater than 0.1 chains/nm$^2$.

5. The substrate according to claim 1, wherein the grafted polymer chain is obtained through a living radical polymerization of at least one compound selected from acrylic acid derivatives, methacrylic acid derivatives, styrene derivatives, vinyl acetates and acrilonitriles.

6. The substrate according to claim 1, wherein the grafted polymer chain of the adjacent particles have a chemical bonding.

7. A flexible display device having a substrate comprising a self-supporting film where a particle having a grafted polymer chain is disposed in two dimensions or three dimensions through the grafted polymer chain.

8. The substrate according to claim 1, wherein the thickness of the self-supporting film is from 0.1 μm to 500 μm.

9. The substrate according to claim 1, wherein a chain growth end of the grafted polymer chain remains active after completion of a radical polymerization reaction.

\* \* \* \* \*